J. THORNTON.
Trace-Carrier.

No. 168,856.    Patented Oct. 19, 1875.

United States Patent Office.

JAMES THORNTON, OF WELLSVILLE, ASSIGNOR TO JOSIAH LETCHWORTH, OF BUFFALO, NEW YORK.

IMPROVEMENT IN TRACE-CARRIERS.

Specification forming part of Letters Patent No. 168,856, dated October 19, 1875; application filed May 24, 1875.

*To all whom it may concern:*

Be it known that I, JAMES THORNTON, of Wellsville, in the county of Allegany and State of New York, have invented certain Improvements in Trace-Carriers, of which the following is a specification:

My invention relates to an improved construction of trace-carrier, the nature of which will be best understood from the following description.

Figure 1:
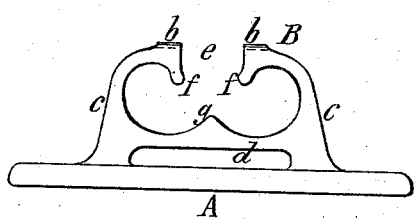
Figure 2:
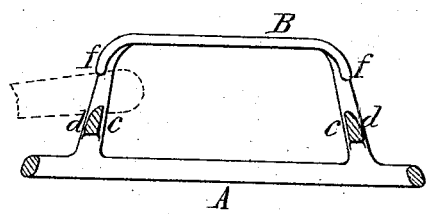
Figure 3:
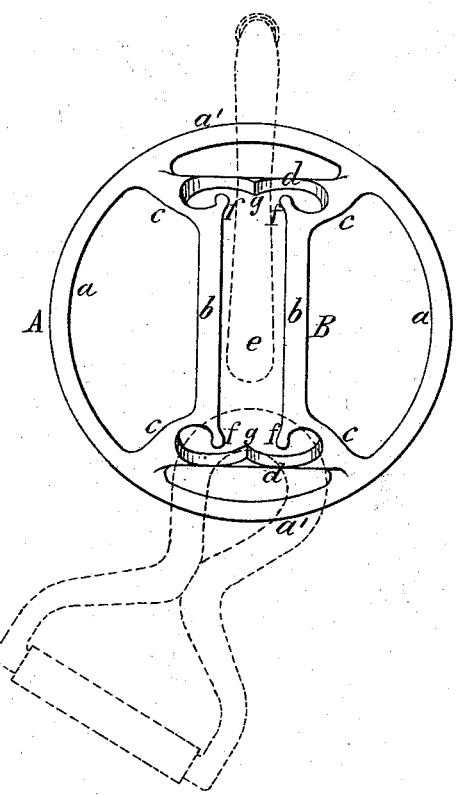

In the accompanying drawing, Figure 1 is a side elevation of my improved trace-carrier. Fig. 2 is a cross-section in line $x\,x$, Fig. 3. Fig. 3 is a plan view of the trace-carrier.

Like letters of reference designate like parts in each of the figures.

A represents the ring or base-frame of my improved trace-carrier; $a\,a$, the portions thereof to which the crupper and back-straps are attached; and $a'\,a'$, the bars to which the hip-straps are secured. B represents the elevated frame formed with the main frame A, and composed of two parallel horizontal bars, $b\,b$, secured to the frame A by upright pieces $c\,c$, diverging from the ends of the bars $b\,b$, and connected at a short distance above the frame A by a cross-bar, $d$. The bars $b\,b$ are arranged transversely or parallel to a line connecting the hip-straps, and at such distance apart as to leave an elongated space or opening, $e$, between them of sufficient width to admit a cockeye when placed edgewise. The supporting pieces $c\,c$ are placed at such a distance apart as to enable the cockeye, after being placed with its broad side toward the frame A, to be drawn out sufficiently to permit the insertion of the other cockeye, as represented by dotted lines in Fig. 3. $f\,f$ are depending teeth or stops projecting downwardly from the ends of the bars $b\,b$, and $g$ an upwardly-projecting tooth arranged in the middle of the cross-bar $d$ to reduce the free space between the teeth $f\,f$ and the cross-bar $d$ to less than the thickness of the round portion of the cockeye, so as to prevent the latter from being drawn out between them, as will presently be described. The cockeye is engaged with the carrier by passing it edgewise through the opening $e$, and then giving it a turn of ninety degrees, when it will be supported by the cross-bar $d$, and securely held against disengagement by the projections $f\,f$ and $g$. In this position the cockeye is perfectly free to adjust itself to any direction which the trace may assume.

In my improved trace-carrier the opening for the insertion of the cockeye is at right angles to the direction of the reins, and therefore not liable to catch the same, and the position of the upright pieces $c\,c$ leaves a sufficient portion of the front part of the base-ring unobstructed to permit of the attachment of crotch-straps, while the whole device is very simple, light, and cheap of construction.

What I claim as my invention is—

The combination, with the base-ring A, of the elevated frame B, provided with opening $e$, cross-bar $d$, and projecting stops $f\,f\,g$, substantially as and for the purpose hereinbefore set forth.

JAMES THORNTON.

Witnesses:
 JAS. MACKEN,
 JOHN THORNTON.